(12) United States Patent
Chien et al.

(10) Patent No.: US 8,610,737 B2
(45) Date of Patent: Dec. 17, 2013

(54) GRAPHIC PROCESSING UNIT (GPU) WITH CONFIGURABLE FILTERING MODULE AND OPERATION METHOD THEREOF

(75) Inventors: Shao-Yi Chien, Taipei (TW); Chih-Hao Sun, Taipei (TW); You-Ming Tsao, Taipei (TW); Ka-Hang Lok, Macao (TW)

(73) Assignee: National Taiwan University, Taipei (TW)

( * ) Notice: Subject to any disclaimer, the term of this patent is extended or adjusted under 35 U.S.C. 154(b) by 517 days.

(21) Appl. No.: 12/788,567

(22) Filed: May 27, 2010

(65) Prior Publication Data

US 2011/0292048 A1    Dec. 1, 2011

(51) Int. Cl.
*G06T 15/50* (2011.01)
(52) U.S. Cl.
USPC ........... 345/586; 345/426; 345/501; 345/582; 345/583
(58) Field of Classification Search
USPC ................................. 345/426, 501, 582–588
See application file for complete search history.

(56) References Cited

U.S. PATENT DOCUMENTS

| | | | | |
|---|---|---|---|---|
| 5,920,495 A * | 7/1999 | Hicok et al. | | 708/308 |
| 6,573,902 B1 * | 6/2003 | Liao et al. | | 345/552 |
| 6,611,265 B1 * | 8/2003 | Hong et al. | | 345/426 |
| 6,768,486 B1 * | 7/2004 | Szabo et al. | | 345/420 |
| 6,822,656 B1 * | 11/2004 | St. Clair et al. | | 345/582 |
| 7,274,373 B1 * | 9/2007 | Bastos et al. | | 345/586 |
| 2003/0053670 A1 * | 3/2003 | Hauper et al. | | 382/130 |
| 2004/0151372 A1 * | 8/2004 | Reshetov et al. | | 382/166 |
| 2004/0174378 A1 * | 9/2004 | Deering | | 345/611 |
| 2006/0250407 A1 * | 11/2006 | Xu | | 345/582 |
| 2008/0018652 A1 * | 1/2008 | Toelle et al. | | 345/506 |
| 2008/0303841 A1 * | 12/2008 | Newhall, Jr. | | 345/587 |
| 2010/0103164 A1 * | 4/2010 | Woo et al. | | 345/419 |
| 2010/0214305 A1 * | 8/2010 | Zimmer | | 345/545 |

OTHER PUBLICATIONS

Segal, Mark: 1999; The OpenGLR Graphics System: A Specifcation (Version 1.2.1); Downloaded from the Internet on Aug. 25, 2012; http://opengl3.org/documentation/specs/version1.2/opengl1.2.1.pdf.*

* cited by examiner

*Primary Examiner* — Xiao M. Wu
*Assistant Examiner* — Todd Buttram
(74) *Attorney, Agent, or Firm* — Muncy, Geissler, Olds & Lowe, PLLC

(57) ABSTRACT

A graphic processing unit (GPU) with a configurable filtering module (CFU) and an operation method thereof are presented. The graphic processing unit comprises a memory module and a configurable filtering module. The memory module stores at least one texture image. The configurable filtering module, connected to the memory module, comprises a plurality of filter equations, from which a filter equation is selected. A plurality of pixel points are sampled from the texture image. Each sampled pixel point is set with a weight value respectively. Each sampled pixel point with a weight value corresponding thereto is substituted into the selected filter equation to perform an operational process to acquire an operated value. Thereby, the user can decide the operation method of the GPU by selecting an appropriate filter equation and setting adjustable parameters in the filter equation.

11 Claims, 13 Drawing Sheets

Application Programming Interface (API) 27

| Name | Type | Description | |
|---|---|---|---|
| TEXTURE MIN FILTER | enum | Set Pixel Windows | 271 |
| TEXTURE MAG FILTER | enum | Set Pixel Windows | 273 |
| TEXTURE FILTER TYPE | enum | Set Filter Type | 275 |
| TEXTURE FILTER COEF | float | Set Coefficients | 277 |
| TEXTURE FILTER COFFSET | constant | Set Coffset | 279 |

FIG.10

GRAPHIC PROCESSING UNIT (GPU) WITH CONFIGURABLE FILTERING MODULE AND OPERATION METHOD THEREOF

1. FIELD OF THE INVENTION

The present invention generally relates to a graphic processing unit (GPU) with a configurable filtering module and an operation method thereof and, more particularly, to a graphic processing unit and an operation method thereof which can be operated by the user by selecting an appropriate filter equation and setting adjustable parameters in the filter equation.

2. BACKGROUND OF THE INVENTION

The conventional 3D GPU with mapping functions is able to display 3D images on the screen of a computer system.

FIG. 1 is a schematic block diagram of a conventional GPU. In FIG. 1, the GPU 100 comprises a memory module 11, a fixed filtering module 13 and a programmable shading module 15. The memory module 11 stores a plurality of texture images 111, which are 2D texture images, as represented by coordinates (U,V) in a 2D texture space, with a texel as a smallest addressable unit. The fixed filtering module 13 comprises texture filter 131 and a cache memory 133. The programmable shading module 15 comprises a plurality of shaders such as vertex shader, geometry shader and pixel shader.

When the GPU 100 operates for 3D graphic process, the programmable shading module 15 depicts a 3D object 151 in a 3D screen space (as shown in FIG. 2A or FIG. 2B) and delivers coordinates P(U, V, D) representing the 3D object 151 to the fixed filtering module 13 in the meantime. The fixed filtering module 13 extracts at least one texture image 111 from the memory module 11 and stores the texture image 111 in the cache memory 133. Afterwards, the texture filter 131 in the fixed filtering module 13 maps the coordinates P delivered from the programmable shading module 15 onto the texture images 111 in the texture space. Then, at least one texel point adjacent to each of the coordinates P is acquired from the cache memory 133 so that the texture filter 131 is able to perform a weighted operation on these adjacent texel points to acquire pixel values of the coordinates P. Later, the fixed filtering module 13 transmits the pixel values of the coordinates P to the programmable shading module 15 to map the pixel values of the coordinates P onto the surface of the 3D object 151 so that the object 151 can be texturized.

Moreover, the cache memory 133 stores texture image levels with respective resolutions corresponding to each texture image 111. The size of each texture image level is half the size of a previous level. For example, if the image size of Level 0 is 256×256, the image size of Level 1 would be 128×128, and the image size can be similarly reduced to 1×1. Bi-linear texture filtering is adopted in the fixed filtering module 13 to calculate the pixel values of the coordinates P representing the 3D object 151 by use of a texture image level with an appropriate resolution (for example, the highest resolution). Alternatively, tri-linear texture filtering can be adopted to calculate the pixel values of the coordinates P representing the 3D object 151 by use of two texture image levels with different resolutions.

Please refer to FIG. 2A, which shows conventional bi-linear texture filtering. In FIG. 2A, bi-linear texture filtering is applied on a single texture image level on which texel points (a, b, c, d) around a coordinate P are sampled by a window 1111 having 2×2 texels to calculate pixel values of the coordinate P. Moreover, bi-linear texture filtering can be implemented by a finite impulse response (FIR) filter equation as expressed in Equation (1):

$$P(U, V, D) = \sum_{k \in W(U,V)} \{I(k) \times C(k)\} + C_{offset} \quad (1)$$

where I(k) represents the texel points (k=a, b, c, d), C(k) represents the weight values of the texels (k=a, b, c, d), and Coffset is the offset for calculation by the filter equation.

Furthermore, please refer to FIG. 2B, which shows conventional tri-linear texture filtering. In FIG. 2B, tri-linear texture filtering is applied on two texture image levels 111 (for example, Level 0 and Level 1) with different resolutions based on the size of the 3D object 151. The coordinate P corresponds to the two texture image levels 111 on which texel points (a, b, c, d and e, f, g, h) around a coordinate P are sampled by a window 1111 having 2×2 texels to calculate pixel values of the coordinate P. Moreover, tri-linear texture filtering can be implemented by a finite impulse response (FIR) filter equation as expressed in Equation (1), where I(k) represents the texel points (k=a, b, c, d, e, f, g, h), and C(k) represents the weight values of the texels (k=a, b, c, d, e, f, g, h).

Even though the modern GPU 100 has achieved improved 3D graphics based operations, there are still some problems to be overcome.

For example, since the GPU 100 is used for 3D graphics, the filter equation adopted by the texture filter 131 in the fixed filtering module 13 is designed to achieve 3D graphics functions. Accordingly, the option for the filter equation is limited by 3D graphics based operations. However, if the GPU 100 is to be used in other applications such as image identification and machine learning algorithm, the fixed filtering module 13 is unable to perform an operational process without the assistance of the programmable shading module 15. As a result, the operational loading of the programmable shading module 15 would be heavier. Moreover, some of the functions of the fixed filtering module 13 are disabled, which leads to poor efficiency of hardware.

Accordingly, if the GPU 100 is to be used in other type of image processing, bi-linear/tri-linear texture filtering adopted in the fixed filtering module 13 would fail to access multiple texels in one process, which results in only one texel accessed by the fixed filtering module 13 during each operation clock. As a result, the efficiency of the GPU 100 would be lowered and the bandwidth of hardware would be underused.

Furthermore, the user can only adopt the filter equation (for example, the FIR linear filter equation) pre-determined by the fixed filtering module 13 and fails to flexibly adjust the sample count (for example, fixed as four sampled points), the size of sampling window (for example, fixed as a window with 2×2 texels), the weight value C(k) of the sampled points or the offset Coffset while calculating the pixel values of the coordinates P corresponding to the 3D object 151 by the use of the pre-determined filter equation.

SUMMARY OF THE INVENTION

It is one object of the present invention to provide a graphic processing unit (GPU) with a configurable filtering module and an operation method thereof, wherein the configurable filtering module provides a plurality of filter equations so that the user can select one from the filter equations when the GPU operates and decides parameters in the filter equation such as the size of the sampling window, the sample count, the weight values of the sampled points and/or the offset for calculation.

It is another object of the present invention to provide a graphic processing unit (GPU) with a configurable filtering module and an operation method thereof, wherein the configurable filtering module can be used not only in 3D graphics, but also in bio-computing or science based computing by use of a variety of filter equations.

It is still another object of the present invention to provide a graphic processing unit (GPU) with a configurable filtering module and an operation method thereof, wherein the user can select an appropriate filter equation and decides adjustable parameters of the filter equation by use of an application programming interface.

In order to achieve the foregoing objects, the present invention provides a graphic processing unit (GPU) with a configurable filtering module, comprising: a memory module for storing at least one texture image; and a configurable filtering module, connected to the memory module, comprising a plurality of filter equations, from which a filter equation is selected; wherein a plurality of pixel points are sampled from the texture image, each sampled pixel point is set with a weight value respectively, and each sampled pixel point with a weight value corresponding thereto is substituted into the selected filter equation to perform an operational process to acquire an operated value.

The present invention further provides an operation method of a graphic processing unit (GPU) with a configurable filtering module, comprising steps of: storing at least one texture image; selecting one from a plurality of filter equations; sampling a plurality of pixel points from the texture image; deciding a weight value corresponding to each of the sampled pixel points; and substituting the sampled pixel points and the weight values into the selected filter equation to perform an operational process to acquire an operated value.

BRIEF DESCRIPTION OF THE DRAWINGS

The objects and spirits of the embodiments of the present invention will be readily understood by the accompanying drawings and detailed descriptions, wherein:

FIG. 10 is a schematic block diagram of an application programming interface according to one preferred embodiment of the present invention;

DETAILED DESCRIPTION OF THE PREFERRED EMBODIMENT

Figure 1:
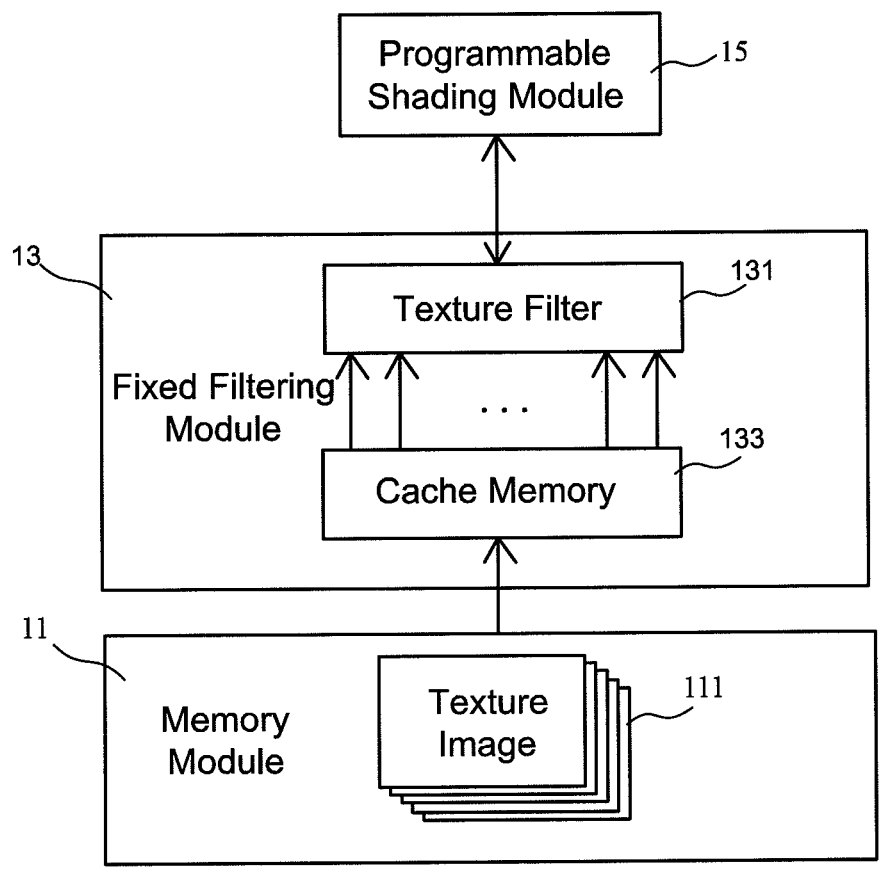
FIG. 1 is a schematic block diagram of a conventional GPU.
Figure 2A:
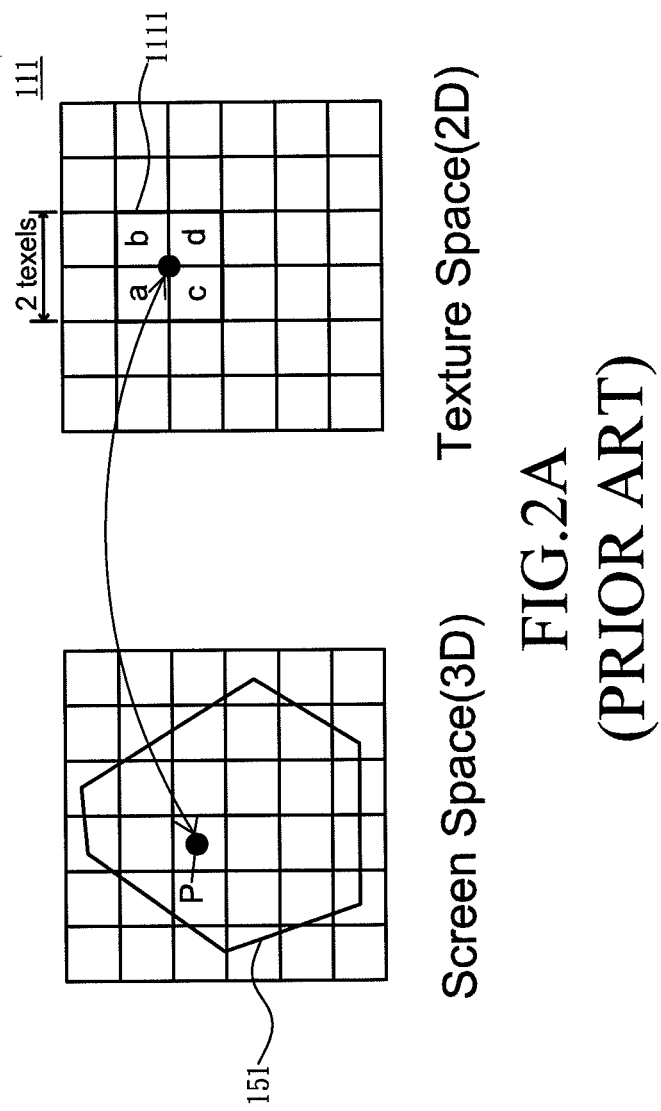
FIG. 2A shows conventional bi-linear texture filtering.
Figure 2B:
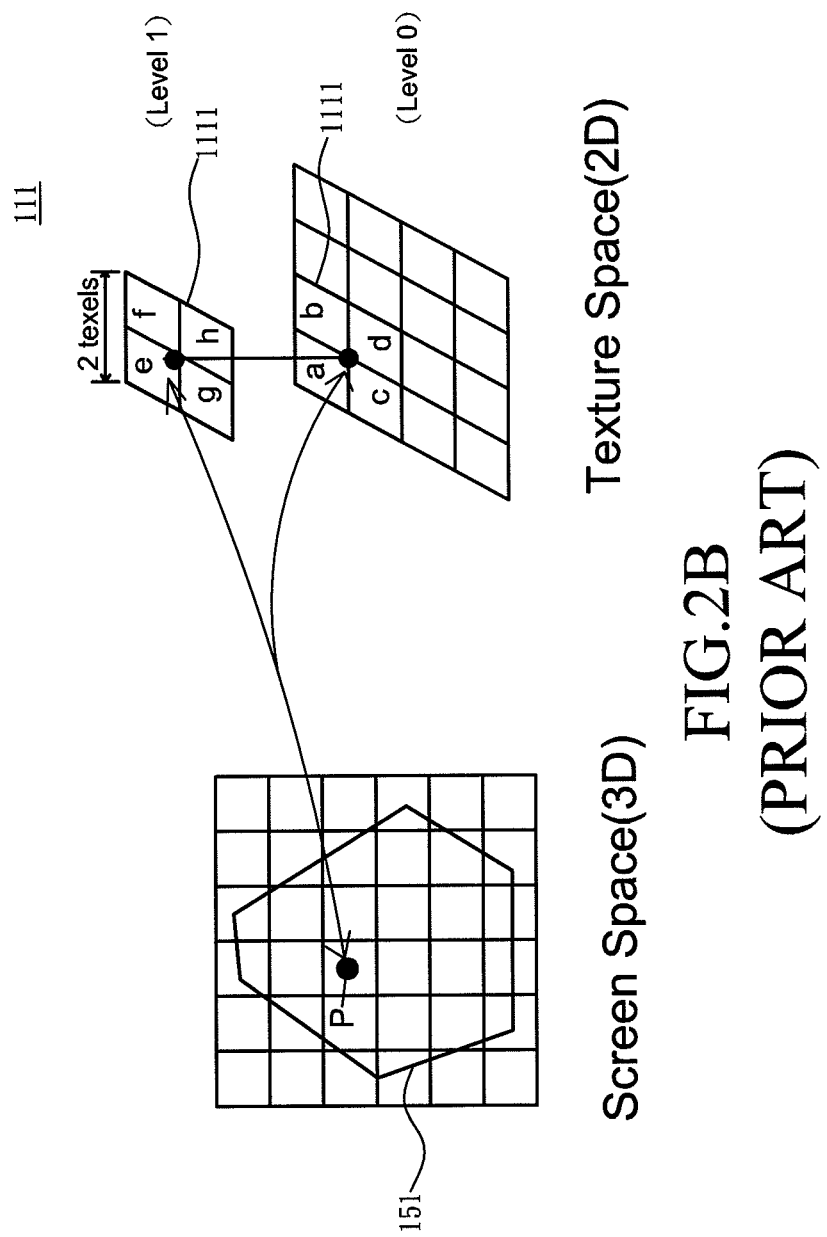
FIG. 2B shows conventional tri-linear texture filtering.
Figure 3:
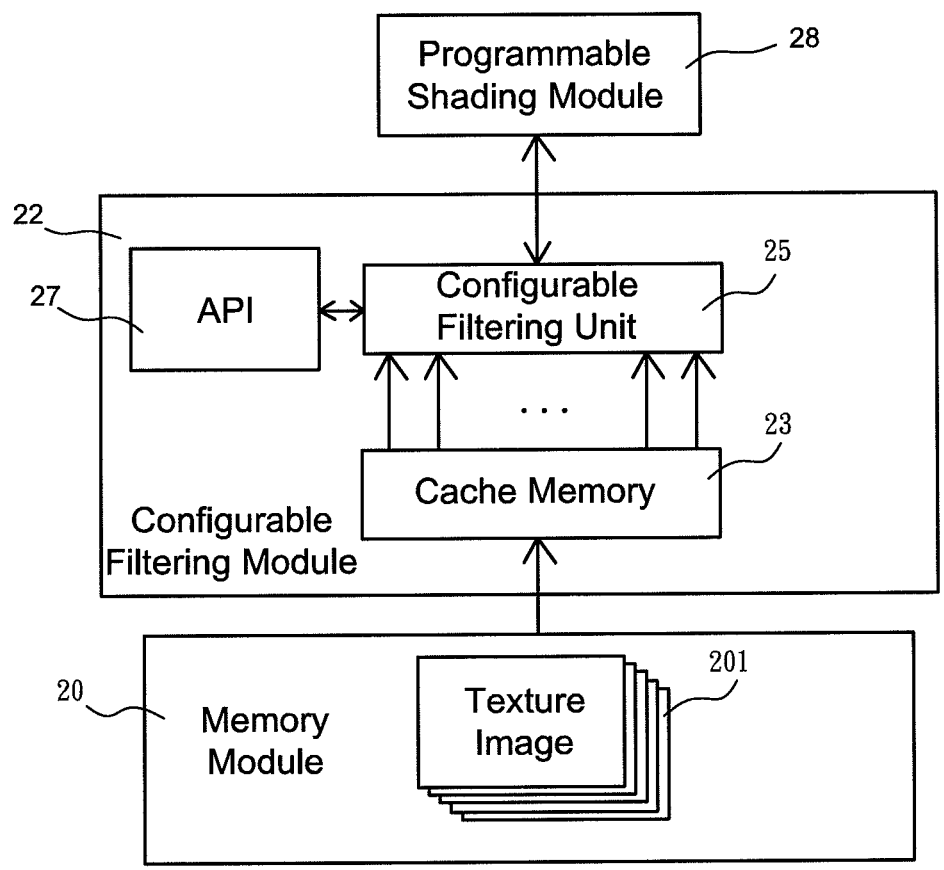
FIG. 3 is a schematic block diagram of a graphic processing unit (GPU) according to one preferred embodiment of the present invention.

Please refer to FIG. 3, which is a schematic block diagram of a graphic processing unit (GPU) according to one preferred embodiment of the present invention. In FIG. 3, the graphic processing unit (GPU) 200 comprises a memory module 20 and a configurable filtering module (CFU) 22. The configurable filtering module 22 is connected to the memory module 20.

Figure 4:
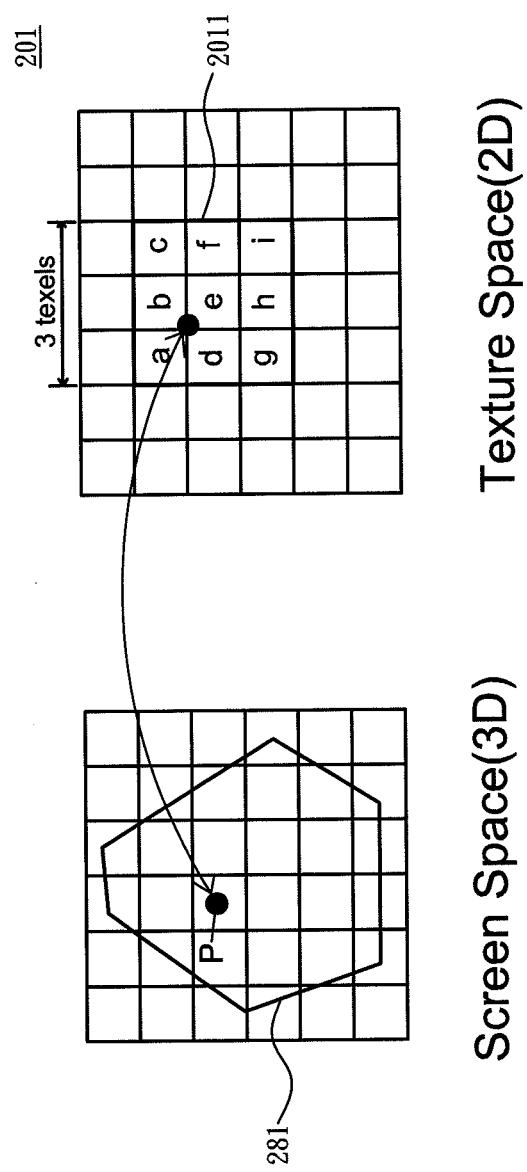
FIG. 4 shows bi-linear texture filtering according to the present invention.

Wherein, the memory module 20 stores a plurality of texture images 201, and the configurable filtering module 22 comprises a plurality of filter equations. For example, the filter equation comprises at least one of a finite impulse response (FIR) filter equation, a maximum morphological filter equation and a minimum morphological filter equation. When the GPU 200 performs a data operation on the texture image 201, the user can select one from the filter equations and decide the size of the window 2011, for example, 3×3, so as to sample a plurality of pixel points I(k) (k=a, b, c, d, e, f, g, h, I) from the texture image 201, as shown in FIG. 4. Afterwards, each of the sampled pixel points I(k) are provided with a corresponding weight value C(k). Each of the sampled pixel points I(k) with the corresponding weight value C(k) is substituted into the selected filter equation to perform an operational process to acquire an operated value.

Accordingly, the user can select an appropriate filter equation from the configurable filtering module 22 in the graphic processing unit (GPU) 200 and adjust the parameters for calculation by use of the filter equation so that the GPU 200 can operate according to the instruction of the user.

Moreover, the configurable filtering module 22 comprises a cache memory 23, a configurable filtering unit 25 and an application programming interface (API) 27. The cache memory 23 is capable of storing the texture image 201. The configurable filtering unit 25 comprises the filter equations and is connected to the cache memory 23 to access the pixel points in the texture image 201. The application programming interface (API) 27 selects one from the filter equations, decides the size of the window 2011 to decide the position and the number of the sampled pixel points I(k) as well as the weight values C(k) corresponding to the sampled pixel points I(k).

The configurable filtering unit 25 accesses the sampled pixel points I(k) from the cache memory 23 according to the size of the window 2011 decided by the application programming interface 27. The selected filter equation performs the operational process to acquire the operated value according to the sampled pixel points I(k) accessed by the configurable filtering unit 25 and the weight values C(k) decided by the application programming interface 27.

Moreover, referring to FIG. 3 and FIG. 4, the graphic processing unit (GPU) 200 of the present invention further comprises a programmable shading module 28. When the graphic processing unit (GPU) 200 is to be used for 3D graphics, the programmable shading module 28 is capable of depicting a 3D object 281 in a 3D screen space and delivering coordinates P(U, V, D) representing the 3D object 281 to the configurable filtering module 22. The configurable filtering module 22 maps the coordinates P onto the texture image 201 in a 2D texture space and samples the pixel points I(k) from the texture image 201 by use of a window 2011 with 3×3 texels to acquire the operated value according to the sampled pixel points I(k) and the weight values C(k). Meanwhile, the operated value is transmitted back to the programmable shading module 28 and is used as a pixel value of one of the coordinates P representing the 3D object 281. Thereby, the 3D object 281 is texturized.

The cache memory 23 stores texture image levels with respective resolutions corresponding to each texture image 201. For example, the size of the texture image levels can be 256×256, 128×128, . . . , 4×4, 2×2, 1×1. In FIG. 4, bi-linear texture filtering is adopted in the configurable filtering module 22 to calculate the pixel values of the coordinates P representing the 3D object 281 by use of a texture image level with an appropriate resolution (for example, the highest resolution). Alternatively, tri-linear texture filtering can be adopted to calculate the pixel values of the coordinates P representing the 3D object 281 by use of two texture image levels with different resolutions.

Figure 5:
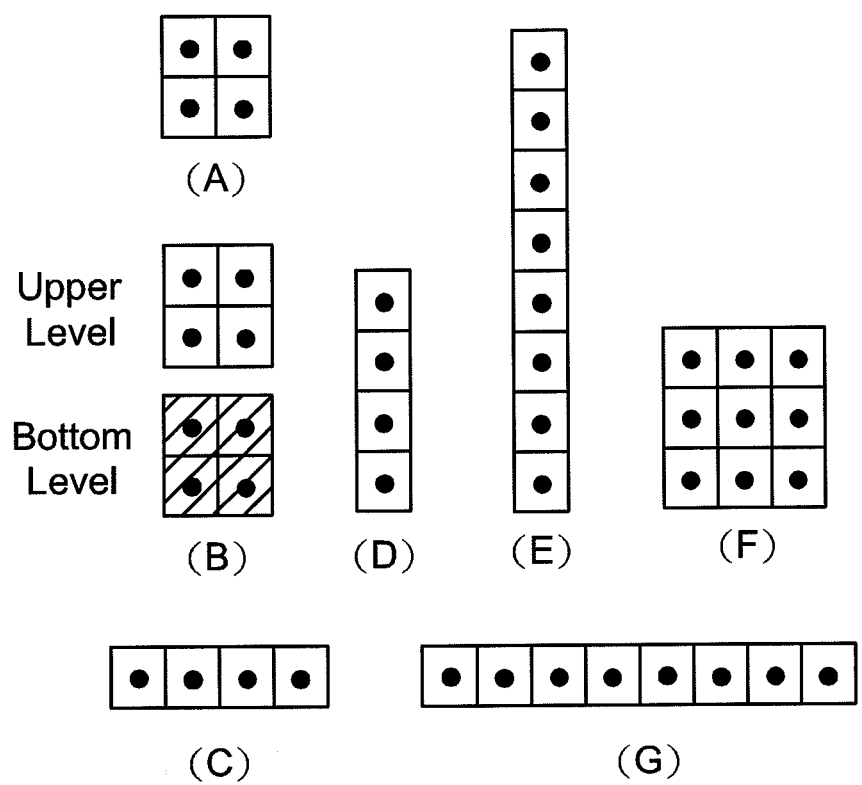
FIG. 5 shows examples of the sizes of windows according to the present invention.

Moreover, in FIG. 4, in addition to the window 2011 with 3×3 texels (as shown in FIG. 5F) for sampling the pixel points I(k) from a single texture image level 201, other windows with 2×2, 4×1, 1×4, 1×8, or 8×1 texels (as shown in FIG. 5A, FIG. 5C, FIG. 5D, FIG. 5E or FIG. 5G) can also be used to sample the pixel points I(k) from a single texture image level 201. Alternatively, as shown in FIG. 5B, a window with 2×2 texels can also be used to sample pixel points I(k) from two texture image levels with different resolutions.

Accordingly, the configurable filtering unit 25 of the present invention can adopt the finite impulse response (FIR) filter equation, the maximum morphological filter equation or the minimum morphological filter equation, as can be expressed as follows:

FIR Filter Equation $$P = \sum_{k \in W(U,V)} \{I(k) \times C(k)\} + \text{Coffset} \quad (2)$$

In Equation (2), the sampled pixel points I(k) and corresponding weight values C(k) are multiplied to acquire a plurality of product values. These product values are summed with an offset Coffset so as to obtain the operated value P.

MAX Morphological Filter Equation $$P = \max_{k \in W(U,V)} \{I(k) \mid C(k)\} \text{ is enabled} \quad (3)$$

In Equation (3), the sampled pixel points I(k) and corresponding weight values C(k) are multiplied to acquire a plurality of product values. These product values are compared to acquire a maximum product value as the operated value P.

MIN Morphological Filter Equation $$P = \min_{k \in W(U,V)} \{I(k) \mid C(k)\} \text{ is enabled} \quad (4)$$

In Equation (4), the sampled pixel points I(k) and corresponding weight values C(k) are multiplied to acquire a plurality of product values. These product values are compared to acquire a minimum product value as the operated value P.

Figure 6:
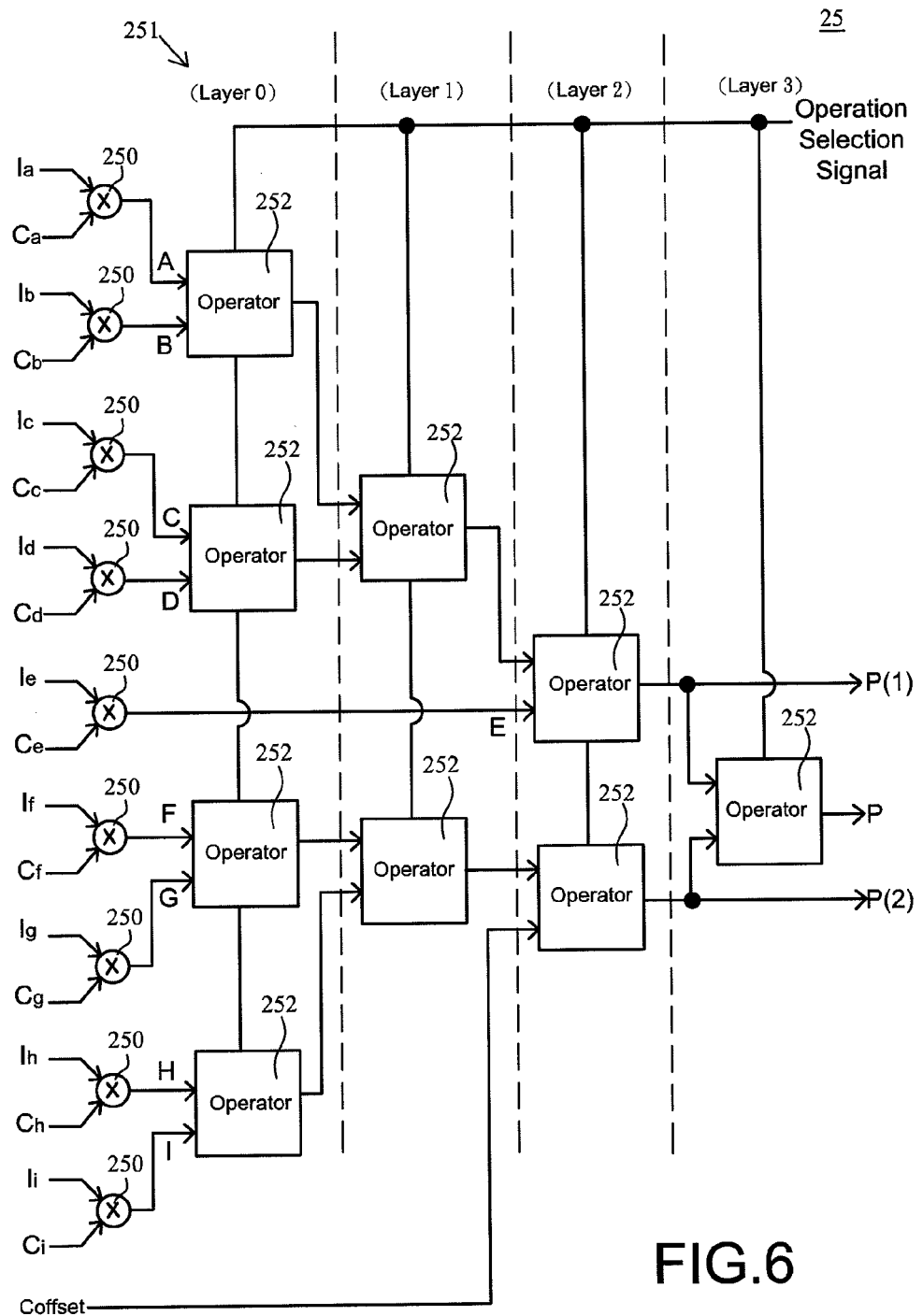
FIG. 6 is a schematic circuit diagram of a configurable filtering unit according to one preferred embodiment of the present invention.

Please further refer to FIG. 6, which is a schematic circuit diagram of a configurable filtering unit according to one preferred embodiment of the present invention. In FIG. 6, the present invention configurable filtering unit 25 comprises a plurality of multipliers 250 and a multilayered operator unit 251. The sampled pixel points I(k=a, b, c, d, e, f, g, h, i) are multiplied with corresponding weight values C(k=a, b, c, d, e, f, g, h, i) by the multipliers 250 to acquire a plurality of product values, such as A, B, C, D, E, F, G, H, I.

The multilayered operator unit 251 is a composed of a plurality of operators 252 to construct a hierarchical structure, for example, 4 layers. Each of the operators 252 receives an operation selection signal to perform the operational process to acquire the operated value P by use of the filter equation according to the operation selection signal.

Figure 7:
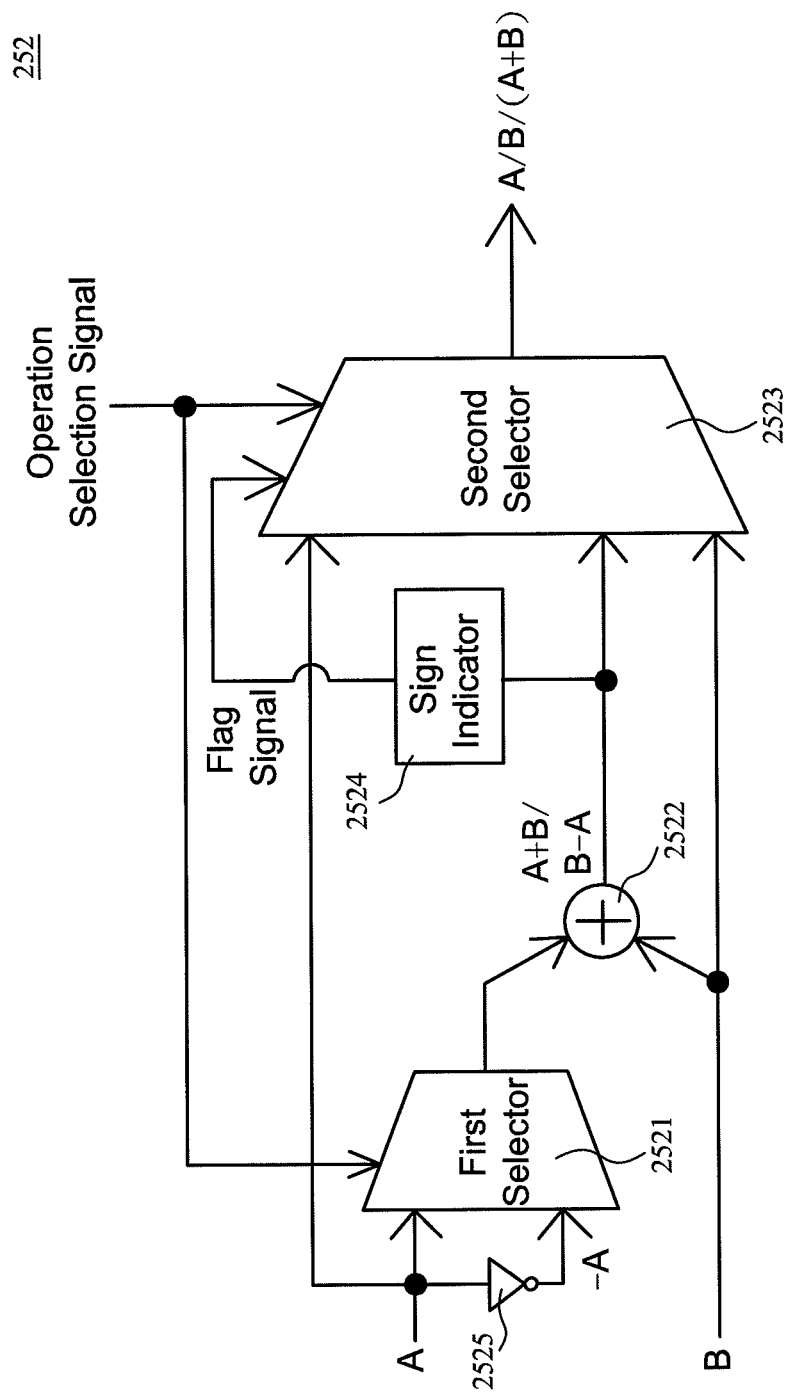
FIG. 7 is a schematic circuit diagram of an operator according to one preferred embodiment of the present invention.

Please refer to FIG. 7, which is a schematic circuit diagram of an operator according to one preferred embodiment of the present invention. In FIG. 7, the product value A and the product value B are exemplified to describe the operator 252 in the present embodiment. The operator 252 comprises a first selector 2521, an adder 2522, a second selector 2523 and a sign indicator 2524.

The first selector 2521 receives the product value A, the inverting product value (−A) and an operation selection signal. Thereby, first selector 2521 decides to output the product value A or the product value (−A) according to the operation selection signal. When the operation selection signal indicates that the FIR linear filter equation is adopted, the first selector 2521 outputs the product value A; when the operation selection signal indicates that the maximum morphological filter equation or the minimum morphological filter equation, the first selector 2521 outputs product value (−A).

The adder 2522 receives the product value A, the product value (−A) or the product value B, so that the product value B is summed with one of the product value A and the product value (−A) so as to calculate a summed value (A+B/B−A).

The sign indicator 2524 receives the sum value (A+B/B−A) to generate a flag signal, which indicates weather the sum value (A+B/B−A) is positive or negative.

The second selector 2523 receives the product value A, the product value B, the sum value (A+B/B−A), the operation selection signal and the flag signal and outputs the product value A, the product value B, or the sum value (A+B) according to the operation selection signal and the flag signal. When the operation selection signal indicates that the operational process is performed by use of the finite impulse response filter equation and the flag signal is positive, the second selector 2523 outputs the sum value (A+B). When the operation selection signal indicates that the operational process is performed by use of the maximum morphological filter equation, the second selector 2523 outputs the product value B if the flag signal is positive (B−A>0), otherwise the second selector 2523 outputs the product value A if the flag signal is negative (B−A<0). When operation selection signal indicates that the operational process is performed by use of the minimum morphological filter equation, the second selector 2523 outputs the product value A if the flag signal is positive (B−A>0), otherwise the second selector 2523 outputs the product value B if flag signal is negative (B−A<0).

Moreover, the operator 252 of the present invention further comprises an inverter 2525 for inverting the product value A to acquire the product value (−A).

In addition, the operational processes of the product values C, D, E, F, G, H, I performed by the operators 252 are similar to those of the product values A and B, and thus descriptions thereof are not presented herein.

After the product values A, B, C, D, E, F, G, H, I are processed by each layer of operators 252, the last layer (layer 3) of operator 252 outputs a summed sum value, a maximum product value or a minimum product value as the operated value P.

Moreover, when the configurable filtering unit 25 adopts the FIR linear filter equation to perform the operational process, one operator 252 of the multilayered operator unit 251 receives an offset so as to add the offset to the summed sum value.

Furthermore, the operator 252 in the present embodiment is exemplified by a window with 3×3 texels. The windows having other sizes can also be used. Moreover, as being used with a window with 1×4, 4×1 or 2×2 texels for sampling from a single level, the operator 252 can be divided into an upper and a bottom circuits. The upper operator 252 is in charge of the pixel points sampled using a window with one size so that the last layer (layer 2) of operator 252 outputs an operated value P1, while the bottom operator 252 is in charge of the pixel points sampled using a window with another size so that the last layer (layer 2) of another operator 252 outputs an operated value P2. Thereby, the pixel points sampled using the two windows are processed in parallel so that the efficiency of the configurable filtering unit 25 is enhanced.

Figure 8:
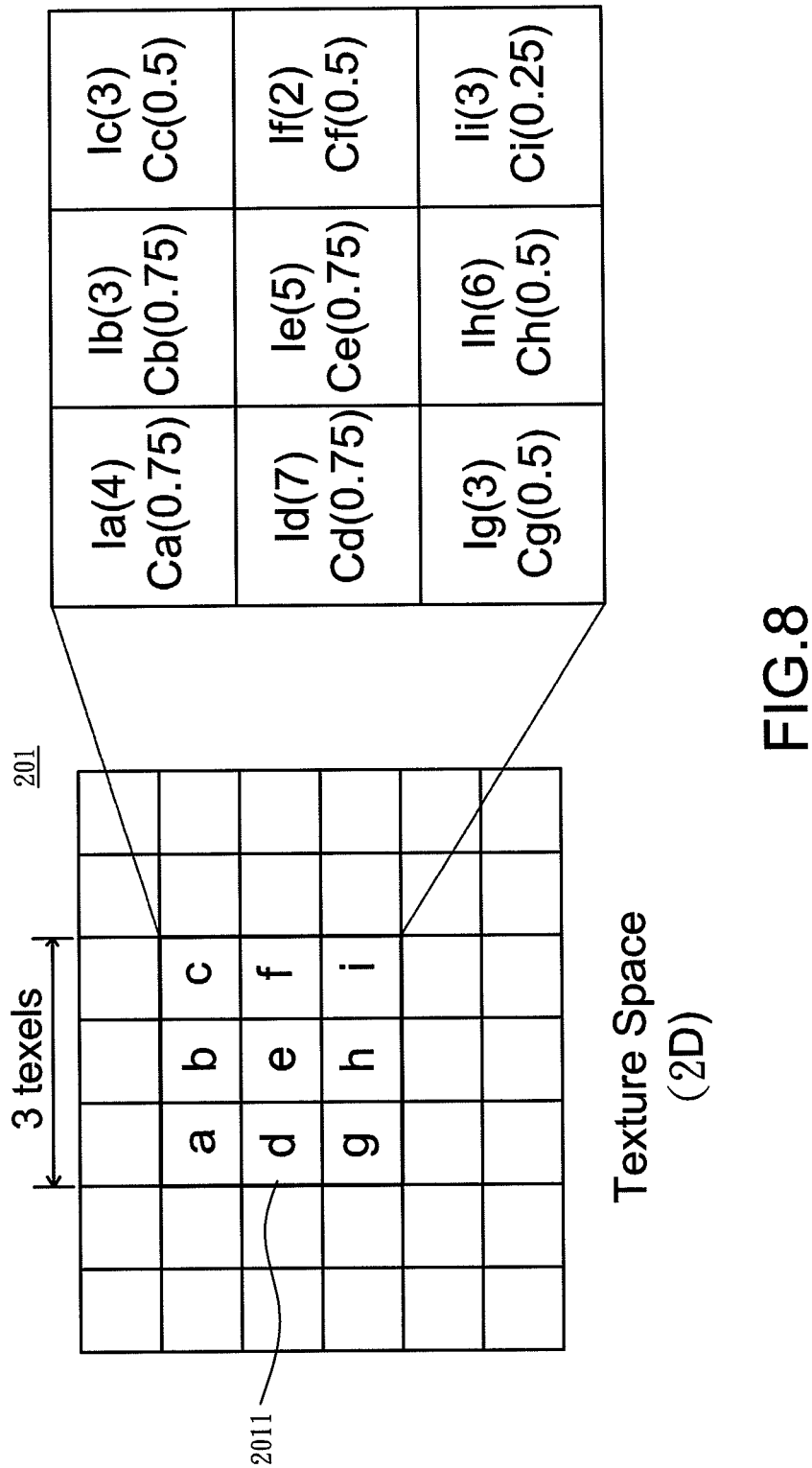
FIG. 8 shows an example that the configurable filtering module performs an operational process by the use of a variety of filter equations according to the present invention.

Furthermore, FIG. 8 shows an example that the configurable filtering module performs an operational process by the use of a variety of filter equations according to the present invention. In the present embodiment, a window with 3×3 texels are used to sample pixel points from the texture image 201. In the present embodiment, the sampled pixel points comprise 9 points (for example, a, b, c, d, e, f, g, h, i) with peak values $I(k)$ being $Ia=4$, $Ib=3$, $Ic=3$, $Id=7$, $Ie=5$, $If=2$, $Ig=3$, $Ih=6$ and $Ii=3$, and the decided weight values $C(k)$ are $Ca=0.75$, $Cb=0.75$, $Cc=0.5$, $Cd=0.75$, $Ce=0.75$, $Cf=0.5$, $Cg=0.5$, $Ch=0.5$ and $Ci=0.25$.

When the configurable filtering unit 25 adopts the FIR linear filter equation to perform the operational process, the pixel values $I(k)$ and the weight values $C(k)$ are substituted into Equation (2) with the offset (Coffset) being set as 1. By calculating product value A (4×0.75=3)+product value B (3×0.75=2.25)+product value C (3×0.5=1.5)+product value D (7×0.75=5.25)+product value E (5×0.75=3.75)+product value F (2×0.5=1)+product value G (3×0.5=1.5)+product value H (6×0.5=3)+product value I (3×0.25=0.75)+offset (1)=23, we obtain a summed sum value being 23 as the operated value P.

When the configurable filtering unit 25 adopts the maximum morphological filter equation to perform the operational process, the pixel values $I(k)$ and the weight values $C(k)$ are substituted into Equation (3). By comparing the product value A (3), the product value B (2.25), the product value C (1.5), the product value D (5.25), the product value E (3.75), the product value F (1), the product value G (1.5), the product value H (3), the product value I (0.75), we obtain a maximum product value D (5.25) as the operated value P.

When the configurable filtering unit 25 adopts the minimum morphological filter equation to perform the operational process, the pixel values $I(k)$ and the weight values $C(k)$ are substituted into Equation (4). By comparing the product value A (3), the product value B (2.25), the product value C (1.5), the product value D (5.25), the product value E (3.75), the product value F (1), the product value G (1.5), the product value H (3), the product value I (0.75), we obtain a minimum product value I (0.75) as the operated value P.

Figure 9:
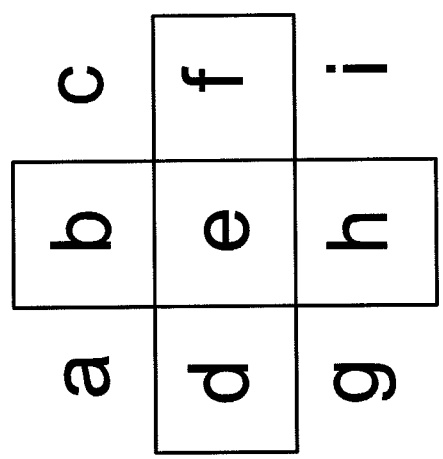
FIG. 9 shows an example of adjusting the number of sampled points according to one embodiment of the present invention.

Please refer to FIG. 9, which shows an example of adjusting the number of sampled points according to one preferred embodiment of the present invention. In present embodiment, the number of sampled points can be adjusted by the use of the maximum/minimum morphological filter equation.

Taking a window with 3×3 texels for example, when the user is to adjust the number of sampled points, the weight values corresponding to the pixel points sampled using the window with 3×3 texels are set as zero. In the present embodiment (FIG. 9), the user can set the weight values corresponding to the a, c, g, i pixel points as zero so that the products of pixel values multiplied with the weight values are zero no matter how large the pixel values of a, c, g, i pixel points are when the maximum morphological filter equation is used to perform the operational process. As a result, a, c, g, i pixel points are no longer sampled.

On the contrary, when the minimum morphological filter equation is used to perform the operational process, the user can set the weight value corresponding to at least one pixel point as zero. Accordingly, the minimum morphological filter equation results in an operated value as zero for the following process. For example, the zero operated value will be mapped onto the 3D object.

Please refer to FIG. 10, which is a schematic block diagram of an application programming interface according to one preferred embodiment of the present invention. In FIG. 10, application programming interface 27 in the present invention comprises a plurality of set pixel windows 271/273/275/277/279.

In the present embodiment, when the graphic processing unit (GPU) 200 is to be used for 3D graphics process, the programmable shading module 28 decides the scale of the depicted 3D object 281 according to the distance of the object lens.

When the 3D object 281 is relatively smaller, the configurable filtering unit 25 accesses at least one texture image level 201 with lower resolution from the cache memory 23. Meanwhile, the user decides a window size in the set pixel windows 271 corresponding to the TEXTURE MIN FLITER. For example, bi-linear texture filtering is adopted with a single point sampled using windows with 2×2, 4×1, 1×4, 1×8, 3×3 or 8×1 texels. Alternatively, tri-linear texture filtering is adopted using a window with 2×2 texels to sample pixel points $I(k)$ from a texture image level with lower resolution.

When the 3D object 281 is relatively larger, the configurable filtering unit 25 accesses at least one texture image level 201 with higher resolution from the cache memory 23. Meanwhile, the user decides a window size in the set pixel windows 273 corresponding to the TEXTURE MAG FLITER. For example, bi-linear texture filtering is adopted with a single point sampled using windows with 2×2, 4×1, 1×4, 1×8, 3×3 or 8×1 texels. Alternatively, tri-linear texture filtering is adopted using a window with 2×2 texels to sample pixel points $I(k)$ from a texture image level with higher resolution.

The user selects one from the filter equations (for example, FIR, MAX or MIN filter equations) in the set filter type 275 corresponding to the TEXTURE FLITER TYPE.

The user sets the weight values $C(k)$ of the sampled pixel points $I(k)$ in the set coefficients 277 corresponding to the TEXTURE FLITER COEF The number of the weight values $C(k)$ is identical to the number of the sampled pixel points $I(k)$. The weight values $C(k)$ can be a float and not limited to any number.

Moreover, if the user selects the FIR filter equation to perform the operational process in the set filter type 275 corresponding to the TEXTURE FLITER TYPE, the user still has to set the offset (Coffset) in the set Coffset 279 corresponding to the TEXTURE FLITER COFFSET in the application programming interface 27. The offset Coffset is a parameter being a constant for calculation by use of the FIR filter equation.

Even though the graphic processing unit (GPU) 200 of the present invention is exemplified using the foregoing drawings for 3D graphics, the GPU 200 can also be used in image processing, bio-computing or science based computing such as image identification and machine learning algorithm. Moreover, a variety of filter equations can be embedded into the configurable filtering module 22 to obtain the operated value for various applications.

Figure 11:
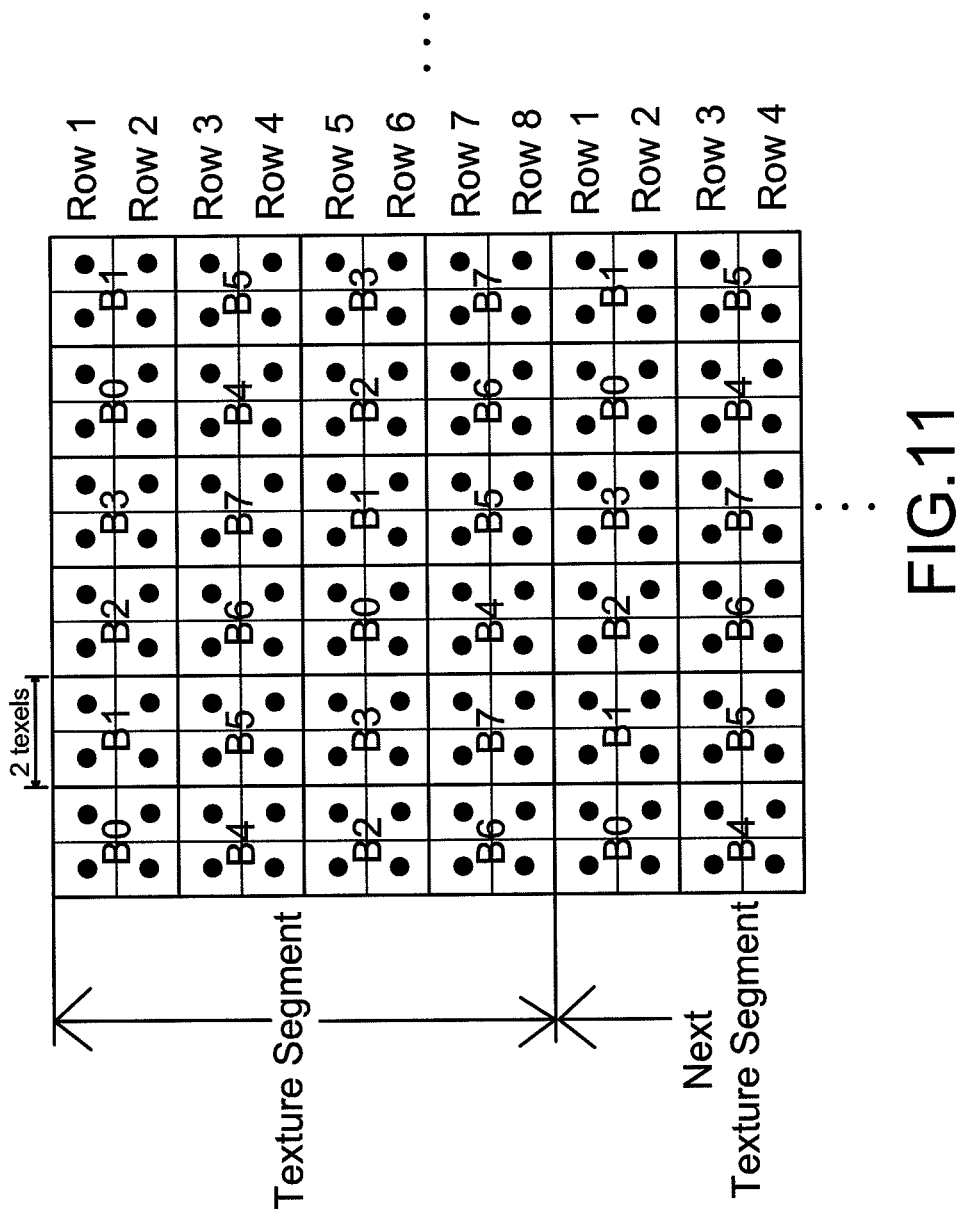
FIG. 11 shows an example of storing texture images in the cache memory according to one preferred embodiment of the present invention.

Please refer to FIG. 11, which shows an example of storing texture images in the cache memory according to one preferred embodiment of the present invention. In FIG. 11, the cache memory 23 comprises a plurality of banks, such as 8 banks (B0-B7). Each bank is capable of transmitting an array of 2×2 texels to the configurable filtering unit 25 during each operation clock.

The cache memory 23 divides the texture image 201 into a plurality of texture segments. Each texture segment comprises 8 rows of coordinate sites. Each of coordinate sites represents a single pixel point. The pixel points on the first row coordinate sites and the second row segment sites of the texture segment are sequentially and circulatingly stored in a first bank B0, a second bank B1, a third bank B2 and a fourth bank B3. The pixel points on the third row coordinate sites and the fourth row segment sites of the texture segment are sequentially and circulatingly stored in a fifth bank B4, a sixth bank B5, a seventh bank B6 and an eighth bank B7. The pixel points on the fifth row coordinate sites and the sixth row segment sites of the texture segment are sequentially and circulatingly stored in the third bank B2, the fourth bank B3, the first bank B0 and the second bank B1. The pixel points on the seventh row coordinate sites and the eighth row segment sites of the texture segment are sequentially and circulatingly stored in the seventh bank B6, the eighth bank B7, the fifth bank B4 and the sixth bank B5.

The cache memory 23 stores the pixel points of the texture image 201. When the configurable filtering unit 25 samples the pixel points from the texture image 201 according to window size, the configurable filtering unit 25 can only access at most 4 pixel points from each bank during each operation clock. Therefore, if the number of sampled pixel points stored in one bank exceeds 4, it takes the configurable filtering unit 25 at least two operation clocks to finish accessing the sampled pixel points, which leads to lowered efficiency of the graphic processing unit (GPU) 200.

Figure 12:
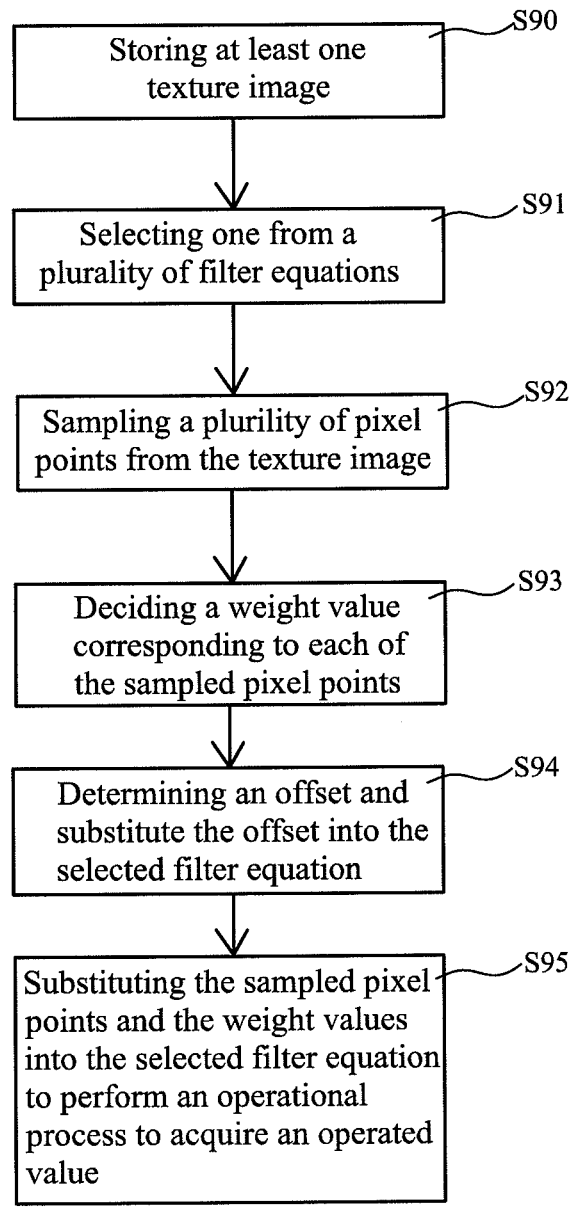
FIG. 12 is a flowchart of an operation method of a graphic processing unit (GPU) according to one preferred embodiment of the present invention.

Please refer to FIG. 12, which is a flowchart of an operation method of a graphic processing unit (GPU) according to one preferred embodiment of the present invention. In Step S90, the graphic processing unit (GPU) 200 stores at least one texture image 201.

In Step S91, the configurable filtering module 22 of the graphic processing unit (GPU) 200 comprises at least one of a plurality of filter equations such as the finite impulse response filter equation, the maximum morphological filter equation and the minimum morphological filter equation. The user can select one from the filter equations for operational processed by the use of an application programming interface 27.

In Step S92, the user samples a plurality of pixel points from the texture image 201 according to the size of a window by use of the application programming interface 27.

In Step S93, the user decides a weight value C(k) corresponding to each of the sampled pixel points I(k) by the use of the application programming interface 27.

In Step S95, the sampled pixel points I(k) with the weight values C(k) corresponding thereto are substituted into the selected filter equation to perform an operational process to acquire an operated value P.

Moreover, the operation method of the graphic processing unit (GPU) in the present invention further comprises Step S94. In Step S94, when the user selects the FIR filter equation to perform an operational process, the user still has to determine an offset (Coffset) so as to substitute the offset into the FIR filter equation. Afterwards, the FIR filter equation performs the operational process on the sampled pixel points I(k), the weight values C(k) and the offset (Coffset) to obtain the operated value P.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A graphic processing unit (GPU) with a configurable filtering module, comprising:
    a memory module for storing at least one texture image; and
    a configurable filtering module, connected to the memory module, comprising a plurality of filter equations including a finite impulse response (FIR) filter equation, a maximum morphological filter equation and a minimum morphological filter equation, from which a filter equation is selected;
    wherein the configurable filtering module comprises:
    a cache memory storing the texture image; and
    a configurable filtering unit, comprising the filter equations and connected to the cache memory to access the pixel points in the texture image;
    wherein the configurable filtering unit comprises:
    a plurality of multipliers performing multiplication on the sampled pixel points and the weight values corresponding thereto to acquire respective a product value; and
    a multilayered operator unit comprising a plurality of operators and receiving the product values, wherein each of the operators in the multilayered operator unit receives an operation selection signal to perform the operational process to acquire the operated value by use of the filter equation according to the operation selection signal;
    wherein each of the operators comprises:
    a first selector receiving one of the product values, and inverting one of the products values and the operation selection signal to output the one of the product values or the inverting one of the product values according to the operation selection signal;
    an adder receiving one of the product values, and inverting one of the product values or another one of the product values to calculate a sum value;
    a sign indicator receiving the sum value to generate a flag signal; and
    a second selector receiving one of the product values, another one of the product values, the sum value, the operation selection signal and the flag signal to output the one of the products values, the another one of the product values or the sum value according to the operation selection signal and the flag signal; and
    an application programming interface selecting the filter equation and deciding the size of at least one window to decide the position and the number of the sampled pixel points from the texture image as well as the weight values corresponding to the sampled pixel point;

wherein the configurable filtering unit accesses the selected filter equation from the cache memory according to the size of the window decided by the application programming interface to calculate the sampled pixel points, so that the selected filter equation performs the operational process to acquire the operated value according to the sampled pixel points accessed by the configurable filtering unit and the weight values decided by the application programming interface; and wherein a plurality of pixel points are sampled from the texture image, each sampled pixel point is set with a weight value respectively, and each sampled pixel point with a weight value corresponding thereto is substituted into the selected filter equation to perform an operational process to acquire an operated value.

2. The graphic processing unit (GPU) according to claim 1, further comprising a programmable shading module capable of depicting a 3D object in a 3D screen space and delivering coordinates representing the 3D object to the configurable filtering module so that the configurable filtering module maps the coordinates onto the texture image in a 2D texture space, decides the size of at least one window and samples the pixel points from the texture image to acquire the operated value according to the sampled pixel points and the weight values, wherein the operated value is transmitted back to the programmable shading module and is used as a pixel value of one of the coordinates representing the 3D object.

3. The graphic processing unit (GPU) according to claim 1, wherein the application programming interface is capable of setting parameters for calculating an offset by use of the finite impulse response filter equation so as to calculate the operated value by substituting the sampled pixel points, the weight value and the offset into the finite impulse response filter equation for the operational process.

4. The graphic processing unit (GPU) according to claim 1, wherein the operator further comprises an inverter for inverting the one of the product values to acquire the inverting one of the product values.

5. The graphic processing unit (GPU) according to claim 1, wherein a last operator in the multilayered operator unit outputs the one of the product values, the another one of the product values or the sum value as the operated value.

6. The graphic processing unit (GPU) according to claim 1, wherein the operator outputs the sum value so that the sum value output by each of the operators is summed with the offset when the operation selection signal indicates that the multilayered operator unit performs the operational process by use of the finite impulse response filter equation.

7. The graphic processing unit (GPU) according to claim 1, wherein the first selector outputs the inverting one of the product values so that the inverting one of the product values is summed with the another one of the product values to calculate the sum value, and the sign indicator decides the sign of the sum value so that the second selector outputs the one of the product values if the sum value is negative or the second selector outputs the another one of the product values if the sum value is positive when the operation selection signal indicates that the multilayered operator unit performs the operational process by use of the maximum morphological filter equation.

8. The graphic processing unit (GPU) according to claim 1, wherein the first selector outputs the inverting one of the product values so that the inverting one of the product values is summed with the another one of the product values to calculate the sum value, and the sign indicator decides the sign of the sum value so that the second selector outputs the another one of the product values if the sum value is negative or the second selector outputs the one of the product values if the sum value is positive when the operation selection signal indicates that the multilayered operator unit performs the operational process by use of the minimum morphological filter equation.

9. The graphic processing unit (GPU) according to claim 1, wherein the texture image comprises a plurality of texture image levels, each of the texture image levels corresponding to a respective resolution.

10. The graphic processing unit (GPU) according to claim 9, wherein the configurable filtering module is able to sample the pixel points from a single texture image level by use of the window with 2×2, 4×1, 1×4, 1×8, 3×3 or 8×1 texels, or the configurable filtering module is able to sample the pixel points from two texture image levels by use of the window with 2×2 texels.

11. A graphic processing unit (GPU) with a configurable filtering module, comprising:

a memory module for storing at least one texture image; and a configurable filtering module, connected to the memory module, comprising a plurality of filter equations including a finite impulse response (FIR) filter equation, a maximum morphological filter equation and a minimum morphological filter equation, from which a filter equation is selected;

wherein the configurable filtering module comprises:

a cache memory storing the texture image; and a configurable filtering unit, comprising the filter equations and connected to the cache memory to access the pixel points in the texture image; and an application programming interface selecting the filter equation and deciding the size of at least one window to decide the position and the number of the sampled pixel points from the texture images as well as the weight values corresponding to the sampled pixel point;

wherein the configurable filtering unit accesses the selected filter equation from the cache memory according to the size of the window decided by the application programming interface to calculate the sampled pixel points, so that the selected filter equation performs the operational process to acquire the operated value according to the sampled pixel points accessed by the configurable filtering unit and the weight values decided by the application programming interface; and wherein a plurality of pixel points are sampled from the texture image, each sampled pixel point is set with a weight value respectively, and each sampled pixel point with a weight value corresponding thereto is substituted into the selected filter equation to perform an operational process to acquire an operated value;

wherein the cache memory comprises 8 banks, each bank being capable of storing an array of 2×2 pixel points during each operation clock, the texture image is divided into a plurality of texture segments, each texture segment comprising 8 rows of coordinate sites, each of the coordinate sites represents a single pixel point, the pixel points on the first row coordinate sites and the second row segment sites of the texture segment are sequentially and circulatingly stored in a first bank, a second bank, a third bank and a fourth bank, the pixel points on the third row coordinate sites and the fourth row segment sites of the texture segment are sequentially and circulatingly stored in a fifth bank, a sixth bank, a seventh bank and an eighth bank, the pixel points on the fifth row coordinate sites and the sixth row segment sites of the texture segment are sequentially and circulatingly stored in the third bank, the fourth bank, the first bank and the second bank, and the pixel points on the seventh row coordinate sites and the eighth row segment sites of the texture segment are sequentially and circulatingly stored in the seventh bank, the eighth bank, the fifth bank and the sixth bank.

* * * * *